Jan. 30, 1951 A. E. PIHL 2,539,468
ELECTRIC BRAKE FOR MACHINE TOOLS AND THE LIKE
Filed Feb. 9, 1949 3 Sheets-Sheet 1

INVENTOR.
A. E. Pihl
BY Charles R. Fay,
Attorney

Jan. 30, 1951     A. E. PIHL     2,539,468
ELECTRIC BRAKE FOR MACHINE TOOLS AND THE LIKE

Filed Feb. 9, 1949     3 Sheets-Sheet 2

INVENTOR.
A. E. Pihl
BY Charles R. Fay,
Attorney

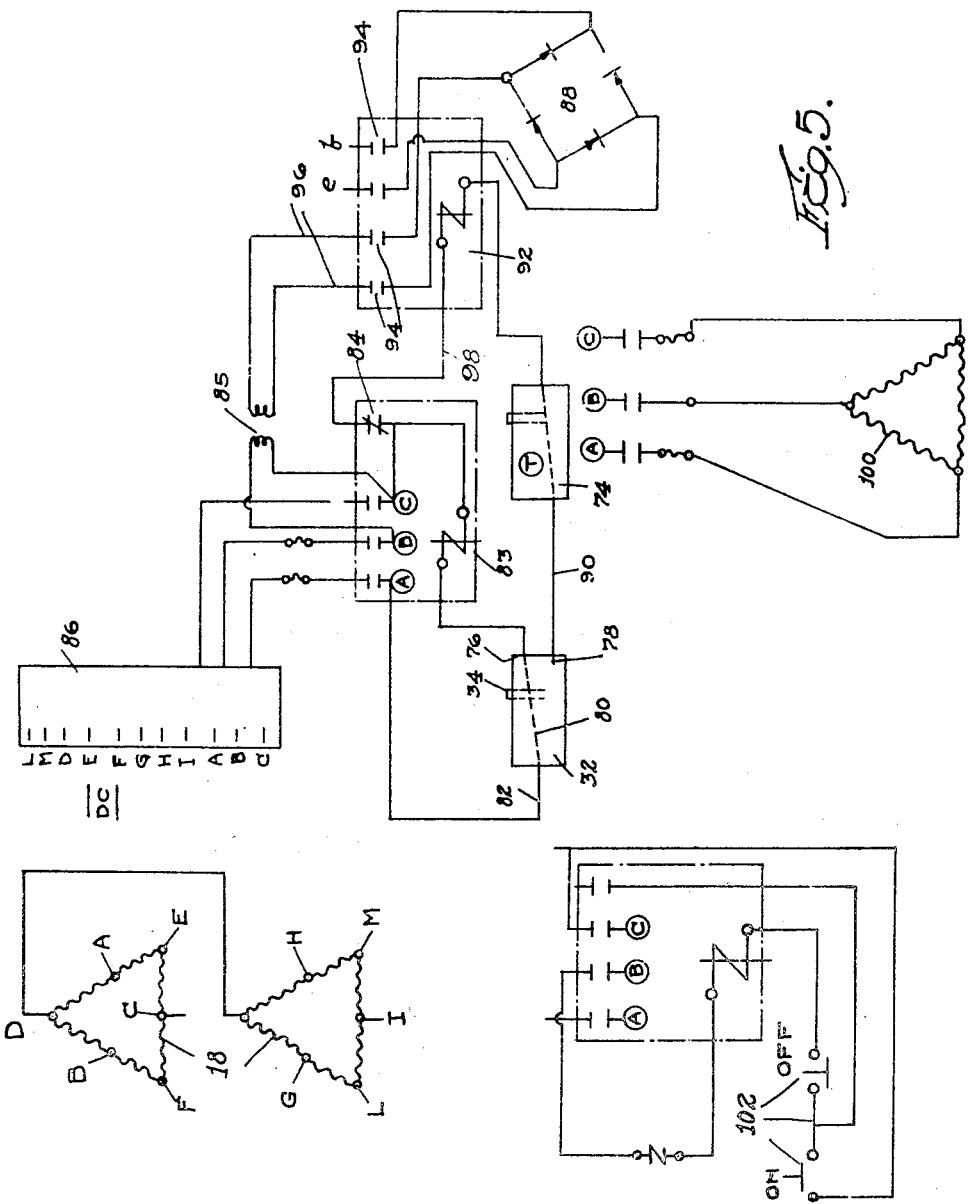

Patented Jan. 30, 1951

2,539,468

UNITED STATES PATENT OFFICE 2,539,468

ELECTRIC BRAKE FOR MACHINE TOOLS AND THE LIKE

Arvo Elmer Pihl, Shrewsbury, Mass., assignor to Leland-Gifford Company, Worcester, Mass., a corporation of Massachusetts Application February 9, 1949, Serial No. 75,351

14 Claims. (Cl. 318—212)

1

This invention relates to electric brakes for the non-working or reverse strokes of machine tools and the like, and provides a means and mechanism for braking and stopping for instance, a rotary tool shaft, e. g., a drill spindle or the like as the same retracts from the work or the working area; and starting the rotation thereof upon the initiation of a work traverse or upon the start of a drill spindle or quill on its downward movement.

Further objects of the invention include the provision of a safety means to prevent the operator from injuring his hand by grasping the rotating spindle or chuck to stop it, by rendering this action unnecessary; and to brake a tool spindle immediately upon retraction thereof and stop the rotation substantially by the time the end of the reverse traverse is reached; the provision of automatic electric switching means to cause A. C. current to energize a tool driving motor upon initiation of the forward traverse and to be shut off at the end of the forward traverse, with application of a D. C. voltage across a winding in the motor to brake and stop the same magnetically; and the provision of means to shut off the D. C. voltage at the end of the reverse traverse or after a predetermined interval, so as to prevent overheating while retaining the advantages of the braking device for the tool shaft or spindle.

Other objects and advantages of the invention will appear hereinafter.

Reference is to be had to the accompanying drawings in which

Fig. 5 is an electric diagram.

It is advantageous to brake and stop the rotation of tool shafts and spindles in machine tools particularly of the types that are hand operated or which are such that the operator may touch and be injured by the shaft or spindle, or which are used with different tools and in which tool changes are necessary. For instance, woodworking machinery is usually provided with sharp, high speed tools and bits which take up to a minute to coast to a stop, so that it is a temptation for the operator to try to grasp the spindle and slow it by hand when changing tools. Also, female operators have been severely injured by entanglement of hair in tool spindles, etc. Thus, in case of frequent tool changes a great deal of time is lost just waiting for the shaft to stop, or injury is invited by trying to decelerate by hand.

2

Where the tools are not frequently changed, the operator is prone to become careless on the non-working retractive stroke of the tool spindle and invite injury in this way.

Figures 1, 2:
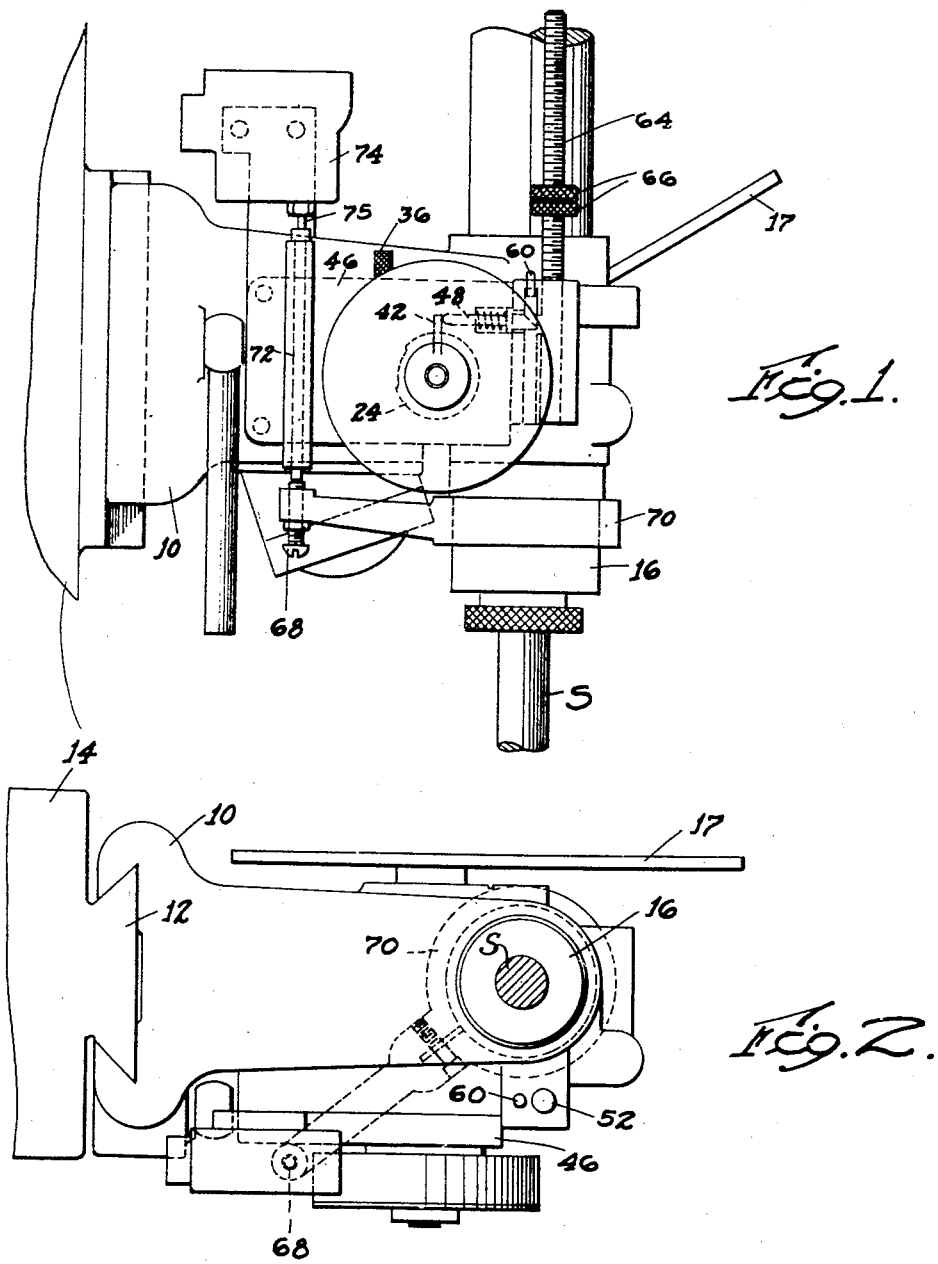
Fig. 1 is a view in side elevation of a head for a machine tool mounted on a standard which is broken away.
Fig. 2 is a top plan view of the parts of Fig. 1.
Figure 3:
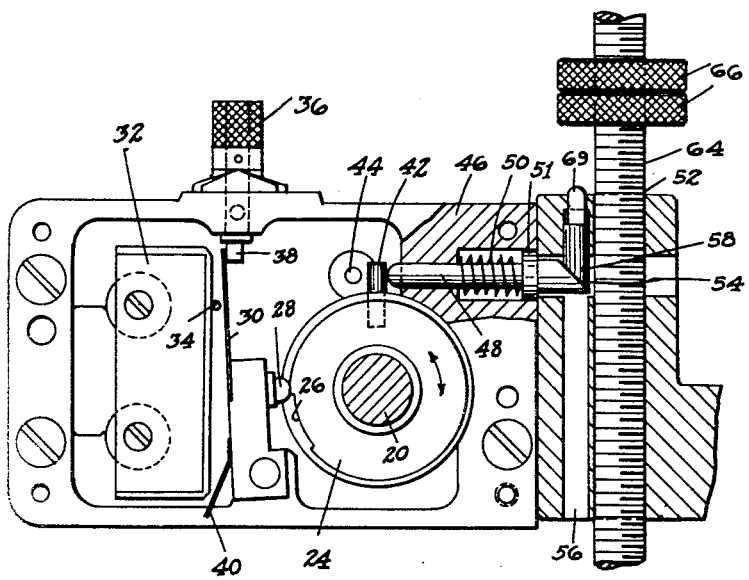
Fig. 3 is a vertical section through the control box for the motor.
Figure 4:
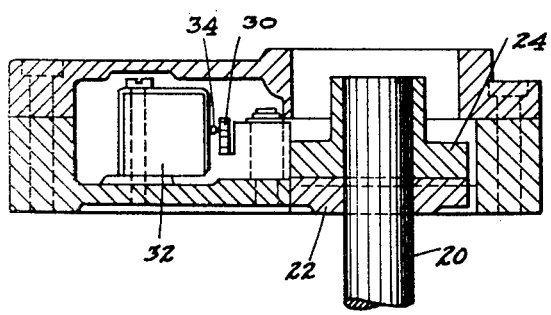
Fig. 4 is a horizontal section through the control box.

As shown in Fig. 1, the present invention is illustrated as applied to a machine tool of the type embodying a sliding drilling and tapping head 10 adjustably mounted on ways 12 on a standard or gooseneck 14. The head 10 slidably mounts a quill 16 for reciprocation therein by any desired or conventional means. Usually in drilling machines a handle or operating arm 17 is arranged to be rotated by the operator and is provided with a spur gear meshing with a rack on the quill and there being a spring return device, see U. S. Letters Patent No. 1,970,218, August 14, 1934. The present application may be considered to present an improvement over the device of said patent. On the other hand, hydraulic means or any other means may be used to reciprocate the quill.

In any case, the quill accommodates a rotary spindle S for which a motor is provided to drive the same, and as thus far described the construction is all old and well known to those familiar with the art, but in this case this motor is A. C. and represented generally at 18 in Fig. 5 as a multispeed motor.

The quill 16 is reciprocated by a shaft 20 geared thereto, and rotated by handle 17, and shaft 20 is secured to a collar 22 having a friction-grip engagement with a rotary or friction cam element 24. The latter is provided with a relieved peripheral edge portion 26 adapted to cooperate with a button 28 on a lever 30 controlling a microswitch generally indicated at 32. This switch is normally closed as to the A. C. line to power the motor, but this line is opened by lever 30 moving to the left and pressing the switch buttons 34; but if left alone, i. e., when lever 30 is moved to the right, switch 32 automatically closes and energizes motor 18 to rotate the spindle.

Switch 32 is shown electrically in the diagram and as will be later described it is a double throw switch which is capable of connecting the motor 18 selectively to A. C. or D. C. current supply for the purposes of this invention.

A selector knob 36 has an eccentric element 38 designed to hold the lever 30 in inoperative position, but if the knob is rotated 180°, the lever 30 can move to the right when relieved portion 26 of the cam 24 arrives at the button 28; a simple leaf spring or the like 40 may be used to constantly urge lever 30 to the right.

A radial pin 42 is secured to the friction cam 24 and a cross pin 44 mounted on the frame or housing 46 engages pin 42 and limits rotation of the cam counterclockwise. A plunger 48 pressed to the right by a spring 50 has a collar 51 limiting the rotation of the cam clockwise. The plunger has an angled end 54 extending into a passage 56 for engagement by an angled corresponding end 58 on a pin 60 extending above the housing 46.

Another passage 62 accommodates the limit screw 64 on which are the adjustable check nuts 66. Since the housing 46 is fixed to the head 10 and the screw 64 as usual is on the quill, the nuts 66 strike the top of pin 60 just as the spindle reaches its lowermost position as determined by the check nuts, and thereby move plunger 48 to the left, moving the pin 42 and cam friction element 24 counterclockwise as limited by pin 44. This action pushes lever 30 to the left by reason of button 28 riding out of relieved portion 26 of the cam. The cam 24 is actually a kind of lost motion device having a limited motion, as described.

If the check nuts do not descend far enough to strike pin 60, the mere reversal of the quill reverses shaft 20, collar 22 and cam 24, the latter of course, moving only as far as limited by pin 44. In either case, as the action of removing material on the part of the tool ceases, and the quill starts upwardly again, the switch 32 is actuated to shut off the A. C. current to the motor and to impress D. C. thereon.

The D. C. voltage stays on the motor until an adjustable control element 68, secured to the quill by a band clamp 70, strikes a plunger 72, raising the latter to actuate a button 75 and open a switch 74, thereby preventing heating. The switch 74 will be so actuated at the top of the stroke of the quill, and the application of the D. C. takes place at the bottom of the stroke, and between these limits the D. C. electrically brakes the spindle motor and stops the spindle.

Referring now to the diagram, the switch 32 is seen to have two contacts 76 and 78, and an arm 80, the latter selectively connecting a lead 82 to either contact 78 or 76. It is to be kept in mind, however, that contact 76 is normally closed and 78 is open at all times except when button 34 is actuated to shift arm 80 from contact 76 to contact 78.

Lead 82 is connected to a line A and 76 is connected to a switch actuating solenoid 83 normally maintaining switch contacts A, B, C, closed and contacts 84 open, the line from this solenoid continuing to one of the line contacts C. By this means the motor 18 is energized. The numeral 85 represents a transformer fed by lines B, C, and 86 is a speed changer for the motor, the leads therein being connectable selectively for speed changes, this forming no part of the present invention.

The transformer supplies a rectifier 88, the D. C. output being indicated as at leads e, f, connected across a winding E, F of the motor, so as to create a magnetic brake thereon when the A. C. is off. This is controlled by line 90 from contact 78, and the switch 74 is in this line to shut off the D. C. at the top of the quill stroke as above described, switch 74 being normally closed but opened by plunger 72 striking the button 75.

Line 90 proceeds to a solenoid 92 which controls switch contacts at 94 for the input leads 96 and output leads e, f of the rectifier, so that the contacts 94 are normally open. From solenoid 92 a line 98 goes to the contacts 84. Thus, if solenoid 83 is energized, solenoid 92 cannot be energized and if contacts 84 are closed, contacts A, B, C, have to be open.

The motor at 100 illustrates the energization of a hydraulic or coolant pump, and the switches 102 show a simple on and off switching arrangement for the entire machine.

The D. C. current may be accurately timed if desired by replacing switch 74 with a conventional timing device T which is energized when contact 78 of switch 32 is closed, and will drop out the D. C. after a predetermined interval, instead of merely using the time of raising the quill for the braking, as above described.

From the above it will be seen that this invention provides an automatic brake and stop for any kind of a tool having a rotary action and that it is particularly adapted to use on a drilling and tapping machine; the D. C. brake takes effect on any reverse motion of the tool i. e., on any backing off from the work whether or not the feed traverse is completed; also, in cases where there is a lost motion between the shaft 20 and the quill, a mere reversal of handle 17 without tool reversal will cause the D. C. brake to be put on so that the tool may be stopped and braked in the hole being drilled and then withdrawn as is desirable in reaming to eliminate scratching, and in boring and in other operations; also, the operator can stop the working traverse, shift the handle back slightly to stop the rotation of the tool shaft, and then continue down to make the next working step. The effect of the brake is to stop the tool spindle almost instantly to all practical intents and purposes, and to make it absolutely positive that the operator cannot be accidentally injured and that the spindle being stopped at full retracted position is instantly available for change of tools, etc. Also, it will be seen that due to the particular construction of the friction element and cam employed, the A. C. current will be applied at any point in the range of travel of the tool upon starting the tool or handle toward the work, that the A. C. and D. C. cannot be applied simultaneously; and that the D. C. is put on and the A. C. taken off upon initiation of movement of the tool away from the work at any point in the travel range of the tool.

Having thus described my invention and the advantages thereof, I do not wish to be limited to the details herein disclosed otherwise than as set forth in the claims, but what I claim is:

1. In a device of the class described, a motor, a tool shaft driven thereby, means to move the shaft to traverse the tool toward the work, means to brake the motor upon initiation of a reverse traverse of the tool shaft, said motor being energized by alternating current and the braking means comprising direct current applied to the motor.

2. In a device of the class described, a motor, a tool shaft driven thereby, means to move the shaft to traverse the tool toward the work, means to brake the motor upon initiation of a reverse traverse of the tool shaft, said motor being energized by alternating current and the braking means comprising direct current applied to the motor, and means effective to shut off the alternating current upon application of the direct braking current.

3. In a device of the class described, a motor, a tool shaft driven thereby, means to move the shaft to traverse the tool toward the work, means to brake the motor upon initiation of a reverse traverse of the tool shaft, said motor being energized by alternating current and the braking means comprising direct current applied to the motor, means effective to shut off the alternating current upon application of the direct braking current, and means to shut off the direct current at the end of the reverse traverse of the tool shaft.

4. In a device of the class described, an A. C. motor, a tool shaft driven thereby, means mounting the tool shaft for reciprocatory movement, a source of alternating and direct current, a switch for turning off the alternating current to the motor and simultaneously applying direct current thereto, and means connected with the tool shaft for operating the switch.

5. In a device of the class described, an A. C. motor, a tool shaft driven thereby, means mounting the tool shaft for reciprocatory movement, a source of alternating and direct current, a switch for turning off the alternating current to the motor and simultaneously applying direct current thereto, means connected with the tool shaft for operating the switch, said last named means being operable upon a motion thereof away from working position of the tool shaft.

6. In a device of the class described, an A. C. motor, a tool shaft driven thereby, means mounting the tool shaft for reciprocatory movement, a source of alternating and direct current, a switch for turning off the alternating current to the motor and simultaneously applying direct current thereto, means connected with the tool shaft for operating the switch, and operating to shut off the direct current and apply the alternating current upon a motion toward working position of the tool shaft.

7. In a device of the class described, an A. C. motor, a tool shaft therefor, means to reciprocate the tool shaft, an element moved in either of two directions by the shaft according to the direction of travel of the latter, sources of A. C. and D. C. voltages, a double pole switch for selectively applying either operating A. C. or D. C. braking voltage to the motor alternately, said element being arranged to actuate the switch according to the direction of movement of the tool shaft.

8. In a device of the class described, an A. C. motor, a tool shaft therefor, means to reciprocate the tool shaft, an element moved in either of two directions by the shaft according to the direction of travel of the latter, sources of A. C. and D. C. voltages, a double pole switch for selectively applying either operating A. C. or D. C. braking voltage to the motor alternately, said element being arranged to actuate the switch according to the direction of movement of the tool shaft, movement of the latter toward working position applying the A. C. and movement in the opposite direction applying the D. C., and a limit switch in the D. C. line to shut off the D. C. upon arrival of the tool shaft at the extreme limit thereof in the non-working direction.

9. An electric brake for a machine tool having an A. C. motor and a reciprocatory tool shaft rotated thereby, comprising a source of direct current, a line to apply the direct current to the A. C. motor, a switch selectively connecting the A. C. voltage or the D. C. voltage to the motor, means rendering the switch mutually exclusive so that but one type of voltage may be applied at a time, means to throw the switch from A. C. to D. C. at the end of the working traverse of the tool shaft, and means to open the D. C. line at the end of the reverse non-working stroke of the tool shaft.

10. An electric brake for a machine tool comprising a reciprocatory tool shaft, an A. C. motor to rotate the same, sources of A. C. and D. C. voltages, a switch selectively and exclusively applying either A. C. or D. C. to the motor, a lost motion friction element connected to the tool shaft and having a limited motion therewith, a switch actuator, said friction element controlling the switch actuator depending on the position of the former as determined by the direction of reciprocation of the tool shaft.

11. An electric brake for a machine tool comprising a reciprocatory tool shaft, an A. C. motor to rotate the same, sources of A. C. and D. C. voltages, a switch selectively and exclusively applying either A. C. or D. C. to the motor, and normally closing the A. C. source to the motor, a lost motion friction element connected to the tool shaft and having a limited motion therewith, a switch actuator, said friction element controlling the switch actuator depending on the position of the former as determined by the direction of reciprocation of the tool shaft, and operating to actuate the switch to open the A. C. line and close the D. C. line.

12. An electric brake for a machine tool comprising a reciprocatory tool shaft, an A. C. motor to rotate the same, sources of A. C. and D. C. voltages, a switch selectively and exclusively applying either A. C. or D. C. to the motor, and normally closing the A. C. source to the motor, a lost motion friction element connected to the tool shaft and having a limited motion therewith, a switch actuator, said friction element controlling the switch actuator depending on the position of the former as determined by the direction of reciprocation of the tool shaft, operating to actuate the switch to open the A. C. line and close the D. C. line, a separate limit switch opening the D. C. line at the end of the retractive or non-working stroke of the tool shaft, and means moving with the latter to engage and actuate the limit switch.

13. An electric brake for a machine tool comprising a reciprocatory tool spindle associated therewith for reciprocating the same, sources of A. C. and D. C. voltages, a switch to selectively apply A. C. or D. C. to the motor, and a device associated with the shaft to actuate said switch depending on the direction of rotation of the shaft.

14. An electric brake for a machine tool comprising a reciprocatory tool spindle associated therewith for reciprocating the same, sources of A. C. and D. C. voltages, a switch to selectively apply A. C. or D. C. to the motor, and a device associated with the shaft to actuate said switch depending on the direction of rotation of the shaft said device comprising a lost motion element for engagement with an actuation of the switch, the latter being a snap switch normally closing the circuit to the A. C. and urged by the lost motion element to move to open the A. C. and close the D. C. circuit.

ARVO ELMER PIHL.

REFERENCES CITED

The following references are of record in the file of this patent:

UNITED STATES PATENTS

| Number | Name | Date |
|---|---|---|
| 1,997,464 | Krebs | Apr. 9, 1935 |
| 2,189,422 | Irwin | Feb. 6, 1940 |
| 2,280,115 | Broders et al. | Apr. 21, 1942 |